US009326248B2

(12) United States Patent
Nobusawa et al.

(10) Patent No.: US 9,326,248 B2
(45) Date of Patent: Apr. 26, 2016

(54) TERMINAL DEVICE, COMMUNICATION METHOD, PROGRAM, STORAGE MEDIUM HAVING PROGRAM STORED THEREON, AND RADIO COMMUNICATION SYSTEM

(71) Applicant: Sharp Kabushiki Kaisha, Osaka-shi, Osaka (JP)

(72) Inventors: Yuichi Nobusawa, Osaka (JP); Shiro Sugahara, Osaka (JP); Akira Ohshima, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/379,335

(22) PCT Filed: Mar. 21, 2013

(86) PCT No.: PCT/JP2013/058026
§ 371 (c)(1),
(2) Date: Aug. 18, 2014

(87) PCT Pub. No.: WO2013/141285
PCT Pub. Date: Sep. 26, 2013

(65) Prior Publication Data
US 2015/0024806 A1    Jan. 22, 2015

(30) Foreign Application Priority Data

Mar. 22, 2012  (JP) ................................ 2012-065563

(51) Int. Cl.
*H04W 52/02*  (2009.01)
*H04W 72/02*  (2009.01)

(52) U.S. Cl.
CPC ...... *H04W 52/0258* (2013.01); *H04W 52/0216* (2013.01); *H04W 72/02* (2013.01)

(58) Field of Classification Search
None
See application file for complete search history.

(56) References Cited

U.S. PATENT DOCUMENTS 8,750,123 B1 *  6/2014  Alisawi ............. H04W 28/0284
                                              370/231
2004/0219919 A1 * 11/2004  Whinnett .......... H04W 72/1278
                                              455/442

(Continued)

FOREIGN PATENT DOCUMENTS

JP    2008-518551 A   5/2008
JP    2009-157648 A   7/2009

OTHER PUBLICATIONS

Official Communication issued in International Patent Application No. PCT/JP2013/058026, mailed on Apr. 23, 2013.

(Continued)

*Primary Examiner* — Kimberly A Williams
(74) *Attorney, Agent, or Firm* — Keating & Bennett, LLP

(57) ABSTRACT

There are provided a terminal device capable of reducing power consumption when a plurality of applications perform data communication, a communication method for the terminal device, a program executed by the terminal device, a storage medium having the program stored thereon, and a radio communication system including the terminal device. The terminal device includes: application running means for running a plurality of applications adapted to perform data communication; communication means for performing a procedure necessary for activating data communication to make a state transition to a communicable state, and performing data communication; and management means for controlling execution of subsequent data communication before a transition from the communicable state to another state.

10 Claims, 11 Drawing Sheets

(56) References Cited

U.S. PATENT DOCUMENTS

| | | |
|---|---|---|
| 2006/0092839 A1 | 5/2006 | Dunko |
| 2007/0088830 A1 | 4/2007 | Borella |
| 2010/0260148 A1* | 10/2010 | Huoviala ......... H04W 52/0258 370/335 |
| 2013/0194993 A1* | 8/2013 | Choi ................ H04L 67/14 370/311 |
| 2013/0301418 A1* | 11/2013 | Ding ................ H04W 76/046 370/241 |
| 2014/0051485 A1* | 2/2014 | Wang ................ H04B 7/2656 455/574 |
| 2014/0226562 A1* | 8/2014 | Shah ................ H04W 76/045 370/328 |
| 2015/0043403 A1* | 2/2015 | Martinez Tarradell ... H04L 5/14 370/311 |

OTHER PUBLICATIONS

Calder et al., "Batch Scheduling of Recurrent Applications for Energy Savings on Mobile Phones", 2010 7th Annual IEEE Communications Society Conference on Sensor Mesh and Ad Hoc Communications and Networks, Jun. 25, 2010, 3 pages.

\* cited by examiner (A)　　　　　　　　　　　(B)

TERMINAL DEVICE, COMMUNICATION METHOD, PROGRAM, STORAGE MEDIUM HAVING PROGRAM STORED THEREON, AND RADIO COMMUNICATION SYSTEM

TECHNICAL FIELD

The present invention relates to a terminal device, a communication method for the terminal device, a program, a storage medium having the program stored thereon, and a radio communication system including the terminal device.

BACKGROUND ART

For a terminal device in a radio communication system, some states are defined. For example, the W-CDMA (Wideband Code Division Multiple Access) scheme defines: an idle state (a state where data transmission/reception is impossible) such as CELL_PCH (Cell Paging Channel) in which paging information is intermittently received from a base station; and a communicable state (a state where data transmission/reception is possible) such as CELL_FACH (Cell Forward Access Channel) in which a small amount of data can be transmitted and CELL_DCH (Cell Dedicated Channel) which enables data to be transmitted/received speedily. The LTE (Long Term Evolution) scheme defines an idle state such as RRC_IDLE in which paging information is intermittently received from a base station, and a communicable state such as RRC_CONNECTED which enables data to be transmitted/received speedily.

When an application running on a terminal device or the like in the idle state is to perform data communication, it is necessary to perform a predetermined connection procedure in order to cause a transition from the idle state to the communicable state.

For example, Japanese National Patent Publication No. 2008-518551 (PTD 1) discloses a method for connecting a mobile electronic device to a network, and the method includes the steps of collecting pattern-of-use information for a packet data session, and determining, based on the collected pattern-of-use information, a default parameter of the mobile electronic device that indicates a timing when the mobile electronic device connects to the network and a timing when the mobile electronic device disconnects the connection to the network. The pattern-of-use information includes priority of data communication, and a user can set the priority.

CITATION LIST

Patent Document

PTD 1: Japanese National Patent Publication No. 2008-518551

SUMMARY OF INVENTION

Technical Problem

For example, when an application in a terminal device in the idle state is to start data communication, the terminal device which is in the idle state makes an RRC (Radio Resource Control) connection, and subsequently an authentication process is performed. When the authentication process is succeeded and the terminal device makes a transition to the communicable state, data communication (packet communication) is started. After the data communication is ended, the RRC connection is released unless data communication is performed for a certain time, and the terminal device makes a transition from the communicable state back to the idle state. Namely, in the case where the terminal device is in the idle state, it is necessary to complete the procedure of RRC connection and authentication process before data communication is started.

The above-referenced Japanese National Patent Publication No. 2008-518551 (PTD 1) fails to explicitly define the timing when an application performs communication, and there is a possibility that applications perform data communication at respective timings different from each other. In this case, each time data communication is to be performed, the procedure of RRC connection and authentication process must be done, resulting in a problem that the current consumption increases.

A more specific example is as follows. When a first application is to perform data communication while a terminal device is in the idle state, the terminal device makes a transition to the communicable state through the procedure of RRC connection and authentication process, and starts initial data communication. After a certain time thereafter elapses and the terminal device makes a transition to the idle state, the terminal device makes a transition to the communicable state through the procedure of RRC connection and authentication process, and accordingly a second application starts the next data communication.

In the case of uplink communication (transmission of data from a terminal device to a base station), it is necessary for a mobile device to send a radio signal, which therefore results in a problem that consumption of electric power to be taken for amplifying the RF (Radio Frequency) signal increases.

An object of the present invention is to provide a terminal device capable of reducing power consumption when a plurality of applications perform data communication, a communication method for the terminal device, a program executed by the terminal device, a storage medium having the program stored thereon, and a radio communication system including the terminal device.

Solution to Problem

According to an aspect of the present invention, a terminal device configured to perform data communication via a radio signal is provided. The terminal device includes: application running means for running a plurality of applications adapted to perform data communication; communication means for performing a procedure necessary for activating data communication to make a state transition to a communicable state, and performing data communication; and management means for controlling performance of subsequent data communication before a transition from the communicable state to another state.

Preferably, the management means includes: means for collecting, from each application, information about a pattern of use indicating a potential request for data communication; means for determining schedule information of data communication for each application, using the collected information about the pattern of use; and means for restricting requests for data communication that are generated by the applications, using the determined schedule information.

Preferably, the information about the pattern of use includes at least one of respective settings of: type of the application; communication cycle length; communication timing; amount of communication data; communication scheme; allowable delay time of communication; contract information; and user setting.

Preferably, the schedule information includes at least one of respective settings of communication cycle length, communication timing, and communication scheme.

It is also preferable that the management means includes: means for receiving from each application a request for data communication as well as corresponding communication data and storing the request and the communication data; and means for causing, when a predetermined condition is satisfied, the procedure necessary for activating data communication to be performed, and starting transmission of the stored communication data.

More preferably, the predetermined condition includes a condition that a predetermined transmission cycle arrives.

More preferably, the predetermined condition includes a condition that the stored communication data attains a predetermined data value.

Preferably, when the management means receives from one of the applications a request for data communication that is set by at least one of a user and a terminal device supplier, the management means causes the procedure necessary for activating data communication to be performed, independently of whether the predetermined condition is satisfied.

According to another aspect of the present invention, a communication method for a terminal device configured to perform data communication via a radio signal is provided. The communication method includes the steps of: running a plurality of applications adapted to perform data communication; aggregating requests for data communication made respectively by the applications; performing a procedure necessary for activating data communication in accordance with the aggregated requests for data communication to make a state transition to a communicable state, and performing data communication.

According to still another aspect of the present invention, a program executed by a terminal device configured to perform data communication via a radio signal is provided. The program causes the terminal device to perform the steps of: running a plurality of applications adapted to perform data communication; aggregating requests for data communication made respectively by the applications; performing a procedure necessary for activating data communication in accordance with the aggregated requests for data communication to make a state transition to a communicable state, and performing data communication.

According to a further aspect of the present invention, there is provided a storage medium having a program stored thereon to be executed by a terminal device configured to perform data communication via a radio signal. The program causes the terminal device to perform the steps of: running a plurality of applications adapted to perform data communication; aggregating requests for data communication made respectively by the applications; performing a procedure necessary for activating data communication in accordance with the aggregated requests for data communication to make a state transition to a communicable state, and performing data communication.

A radio communication system according to a further aspect of the present invention includes: a base station; and a terminal device configured to perform data communication with the base station via a radio signal. The terminal device includes: application running means for running a plurality of applications adapted to perform data communication; communication means for performing a procedure necessary for activating data communication to make a state transition to a communicable state, and performing data communication; and management means for controlling performance of subsequent data communication before a transition from the communicable state to another state.

Advantageous Effects of Invention

In accordance with the present invention, power consumption when a plurality of applications perform data communication can be reduced.

DESCRIPTION OF EMBODIMENTS

Figure 1:
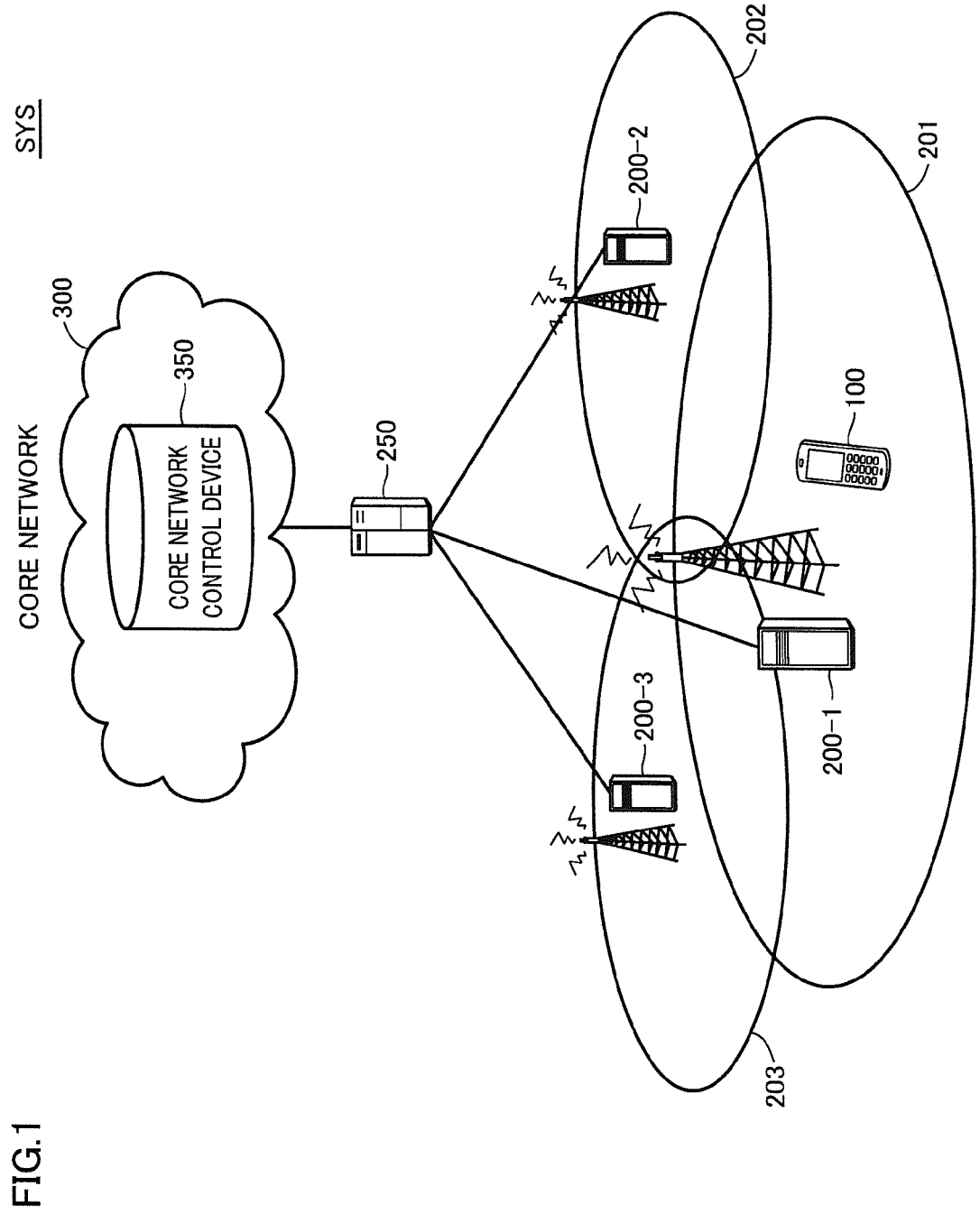
FIG. 1 is a schematic diagram showing an example of the overall configuration of a radio communication system according to the present embodiment.

The present embodiment will be described in detail with reference to the drawings. In the drawings, the same or corresponding parts are denoted by the same reference characters, and a description thereof will not be repeated.

For a terminal device in a radio communication system, some states are defined. For example, the W-CDMA (Wideband Code Division Multiple Access) scheme defines: an idle state (a state where data transmission/reception is impossible) such as CELL_PCH (Cell Paging Channel) in which paging information is intermittently received from a base station; and a communicable state (a state where data transmission/reception is possible) such as CELL_FACH (Cell Forward Access Channel) in which a small amount of data can be transmitted and CELL_DCH (Cell Dedicated Channel) which enables data to be transmitted/received speedily. The LTE (Long Term Evolution) scheme defines an idle state such as RRC_IDLE in which paging information is intermittently received from a base station, and a communicable state such as RRC_CONNECTED which enables data to be transmitted/received speedily.

When an application running on a terminal device or the like in the idle state is to perform data communication, it is necessary to perform a predetermined connection procedure in order to cause a transition from the idle state to the communicable state.

<A. Overall Configuration of Radio Communication System>

FIG. 1 is a schematic diagram showing an example of the overall configuration of a radio communication system SYS according to the present embodiment. Radio communication system SYS includes base stations 200-1, 200-2, 200-3 (hereinafter also referred to collectively as "base station 200"). Base stations 200-1, 200-2, 200-3 use physically and/or logically defined cells to provide service areas 201, 202, 203, respectively.

A terminal device 100 performs data communication with base station 200 via a radio signal. More specifically, terminal device 100 connects to base station 200 which provides the service area where the terminal device is present, and exchanges data on the packet basis with the base station. In terminal device 100, a plurality of applications are implemented, and at least a part of these applications performs data communication to exchange data with another entity, as will be described later herein.

Base stations 200-1, 200-2, 200-3 are each connected to a gateway 250. Gateway 250 includes an MME (Mobility Management Entity) function. The MME function performs control such as setting and release of packet-communication sessions (connections) and handover (switching of the base station). Gateway 250 is connected to a core network 300. Core network 300 includes a core network control device 350. Core network control device 350 includes an SAE gateway (System Architecture Evolution Gateway) function. The SAE gateway function performs routing of packets in core network 300.

The number of base stations 200 and the number of gateways 250 that are included in radio communication system SYS as well as the topology thereof are designed appropriately for the system.

<B. Overview of Problem and Means for Solution>

A description will next be given of an overview of a problem on which the terminal device of a first embodiment focuses as well as means for solution thereof.

Figure 2:
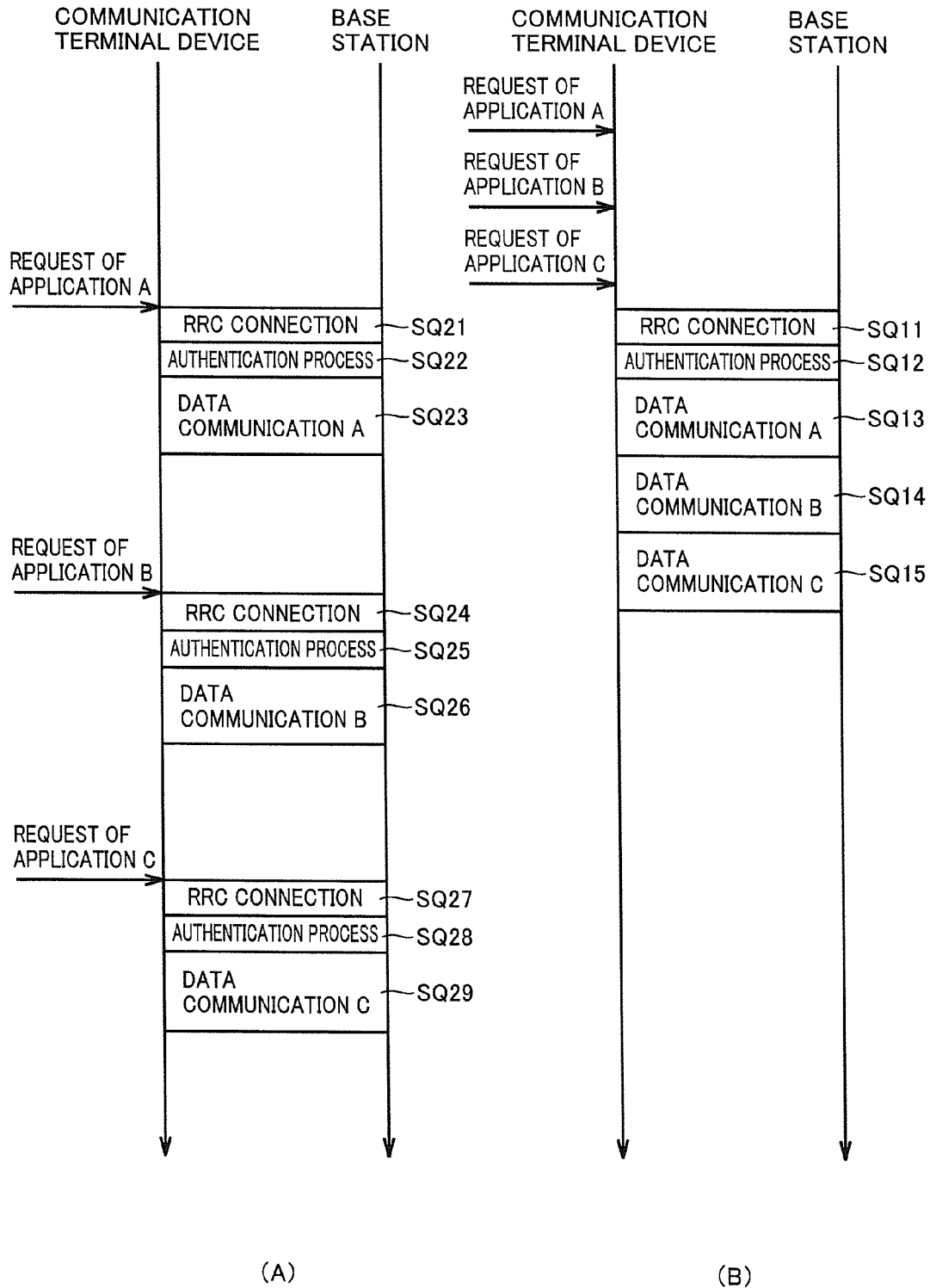
FIG. 2 is a diagram for illustrating an overview of data communication by a terminal device according to the present embodiment.

FIG. 2 is a diagram for illustrating an overview of data communication by the terminal device according to the present embodiment. In FIG. 2(A), a procedure involved in relevant data communication is shown. In FIG. 2(B), a procedure involved in data communication according to the present embodiment is shown. Regarding FIG. 2(A) and FIG. 2(B), it is supposed by way of a typical example that three applications (applications A, B, C) are installed in a terminal device.

Each application basically generates a connection request independently of operations of the other applications. Under such a situation, applications A, B, C request data communications at their own timings as shown in FIG. 2(A). In the relevant art, if the terminal device is in the idle state, the procedure of RRC connection and authentication process is performed in response to each of respective requests for data communication.

Namely, in a certain terminal device in the idle state, in response to a request for data communication that is made by application A, the procedure of RRC connection (sequence SQ21) and authentication process (sequence SQ22) is performed, and thereafter data communication is enabled (sequence SQ23). If data communication is not performed for a certain time, the RRC connection is released and the terminal device makes a transition back to the idle state.

In response to a request for data communication that is made by application B while the terminal device is in the idle state again, the procedure of RRC connection (sequence SQ24) and authentication process (sequence SQ25) is performed again and thereafter data communication is enabled (sequence SQ26). After another certain time has passed, in response to a request for data communication that is made by application C while the terminal device is in the idle state again, the procedure of RRC connection (sequence SQ27) and authentication process (sequence SQ28) is performed again as well, and thereafter data communication is enabled (sequence SQ29).

As shown in FIG. 2(A), if the RRC connection and the authentication process are performed each time data communication is requested by an application, power consumption is larger. In particular, these processes require uplink communication and power consumption is larger due to amplification of the RF signal in the terminal device, for example.

In view of the above, terminal device 100 according to the present embodiment aggregates requests for data communication made respectively by applications, in such a manner that starts the subsequent data communication before a state transition (to the idle state for example) of the terminal device is made, to thereby reduce the number of times the procedure of RRC connection and authentication process is performed and accordingly reduce power consumption.

More specifically, as shown in FIG. 2(B), even when applications A, B, C make respective requests for data communications at respective timings different from each other, their requests for data communication are aggregated. After this, the procedure of RRC connection (sequence SQ11) and authentication process (sequence SQ12) is performed at an appropriate timing, and thereafter data communications of applications A, B, C are successively performed (sequences SQ13, SQ14, SQ15) (before a state transition (to the idle state for example) of the terminal device is made). As is apparent from a comparison between FIG. 2(A) and FIG. 2(B), it is seen that the number of times the procedure of RRC connection and authentication process is performed is reduced from three to one.

Next, a description will be given of an overview of a problem on which terminal devices according to second and third embodiments focus as well as means for solution thereof.

Figure 11:
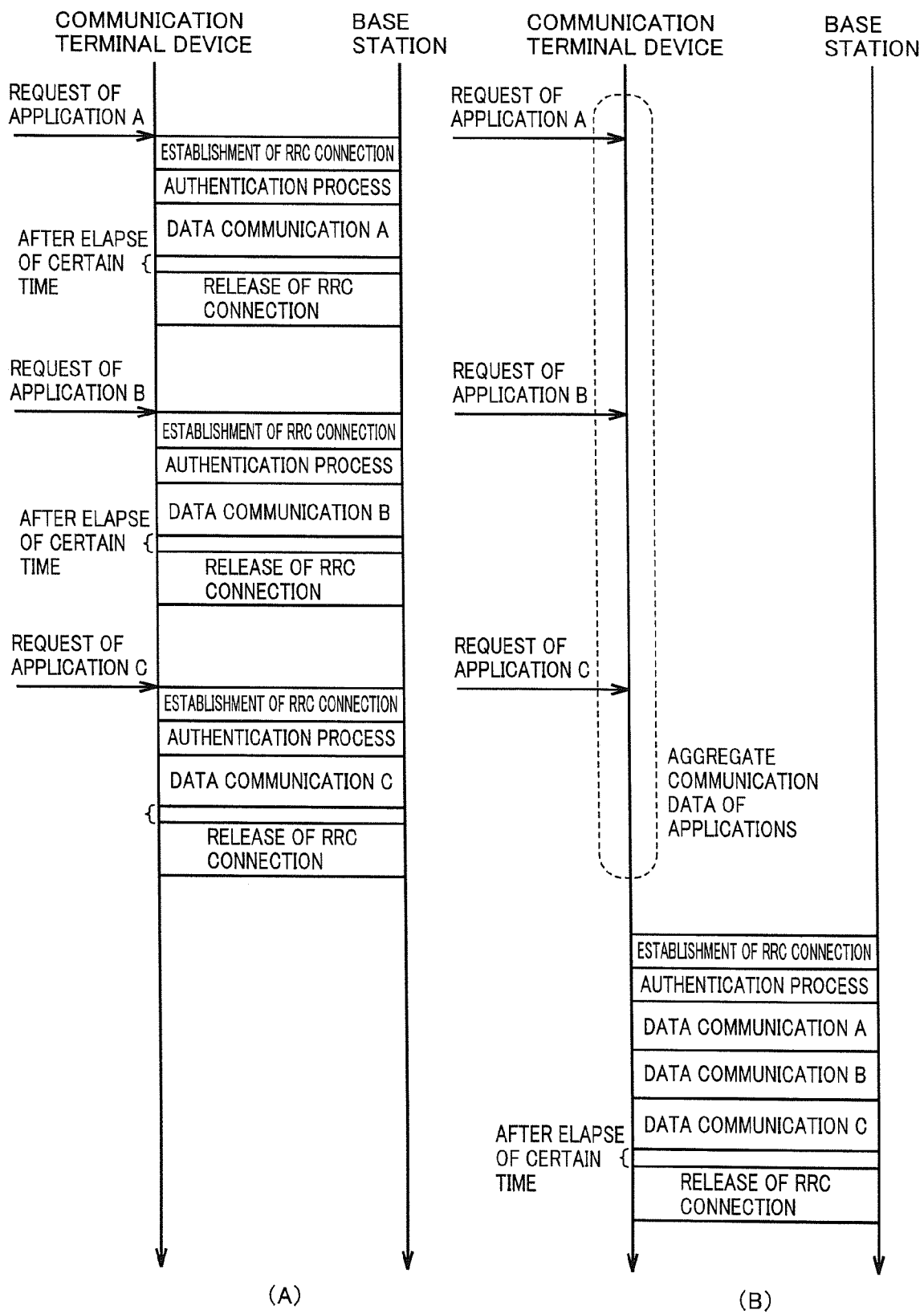
FIG. 11 is another diagram for illustrating an overview of data communication by the terminal device according to the present embodiment.

FIG. 11 is a diagram for illustrating an overview of data communication by the terminal device according to the present embodiment. In FIG. 11(A), a procedure involved in relevant data communication is shown. In FIG. 11(B), a procedure involved in data communication according to the present embodiment is shown. Regarding FIG. 11(A) and FIG. 11(B), it is supposed by way of a typical example that three applications (applications A, B, C) are installed in a terminal device.

Each application basically generates a connection request independently of operations of the other applications. Under such a situation, applications A, B, C request data communications at their own timings as shown in FIG. 11(A). In the relevant art, if the terminal device is in the idle state, the procedure of RRC connection and authentication process is performed in response to each of respective requests for data communication.

Namely, in a certain terminal device in the idle state, in response to a request for data communication that is made by application A, the procedure of RRC connection (sequence SQ21) and authentication process (sequence SQ22) is performed, and thereafter data communication is enabled (sequence SQ23). If data communication is not performed for a certain time, the RRC connection is released and the terminal device makes a transition back to the idle state.

In response to a request for data communication that is made by application B while the terminal device is in the idle state again, the procedure of RRC connection (sequence SQ24) and authentication process (sequence SQ25) is performed again and thereafter data communication is enabled (sequence SQ26). After another certain time has passed, in response to a request for data communication that is made by application C while the terminal device is in the idle state again, the procedure of RRC connection (sequence SQ27) and authentication process (sequence SQ28) is performed again as well, and thereafter data communication is enabled (sequence SQ29).

As shown in FIG. 11(A), if the RRC connection and the authentication process are performed each time data communication is requested by an application, power consumption is larger. In particular, these processes require uplink communication and power consumption is larger due to amplification of the RF signal in the terminal device, for example.

In view of the above, terminal device 100 according to the present embodiment aggregates requests for data communication made respectively by applications, before a state transition (to the idle state for example) of the terminal device is made, to thereby reduce the number of times the procedure of RRC connection and authentication process is performed and accordingly reduce power consumption.

More specifically, as shown in FIG. 11(B), even when applications A, B, C make respective requests for data communications at respective timings different from each other, their requests for data communication are aggregated.

In the second embodiment, the procedure of RRC connection (sequence SQ11) and authentication process (sequence SQ12) is performed at timings corresponding to predetermined intervals, and data communications of applications A, B, C are successively performed (sequences SQ13, SQ14, SQ15) (before a state transition of the terminal device is made).

In the third embodiment, at a timing when a certain volume of transmission data has been accumulated, the procedure of RRC connection (sequence SQ11) and authentication process (sequence SQ12) is performed, and data communications of applications A, B, C are successively performed (sequences SQ13, SQ14, SQ15) (before a state transition of the terminal device is made).

As is apparent from a comparison between FIG. 11(A) and FIG. 11(B), it is seen that the number of times the procedure of RRC connection and authentication process is performed is reduced from three to one.

As a matter of course, a state transition of the terminal device to the idle state for example occurs not only 1) when a predetermined time has elapsed from the final data communication (transmission or reception), but also 2) when a procedure for termination or the like of communication, such as a procedure of severing connection is performed by the terminal device itself or by a device with which the terminal device communicates.

In this way, the number of times the procedure of RRC connection and authentication process is performed is decreased and accordingly the power consumption by terminal device 100 is reduced.

Namely, in the present embodiment, requests for data communications made respectively by applications are aggregated and then execution of the procedure necessary for performing data communication is controlled. Specifically, timings at which a plurality of applications perform data communication respectively are synchronized with each other to thereby reduce the number of times the procedure of RRC connection and authentication process is performed, so that the data communications of these applications are completed through the procedure of RRC connection and authentication process which is performed once.

In the following first to third embodiments, more specific methods as described below are employed respectively to thereby reduce the number of times the procedure of RRC connection and authentication process is performed.

(1) First Embodiment

A module which manages communication of terminal device 100 collects information about a pattern of use of each application, and determines a communication schedule. Each application follows the determined communication schedule to request a communication layer for data communication.

(2) Second Embodiment

A module which manages communication of terminal device 100 temporarily stores communication data of each application, and then transmits the stored data at predetermined intervals to a communication layer and requests the communication layer for data communication.

(3) Third Embodiment

A module which manages communication of terminal device 100 temporarily stores communication data of each application. When the stored data attains a predetermined data value (byte count), the module transmits the stored data to a communication layer and requests the communication layer for data communication.

<C. Device Configuration>

First of all, a description will be given of a hardware configuration of each entity which is a constituent of radio communication system SYS shown in FIG. 1.

[c1: Configuration of Terminal Device 100]

Figure 3:
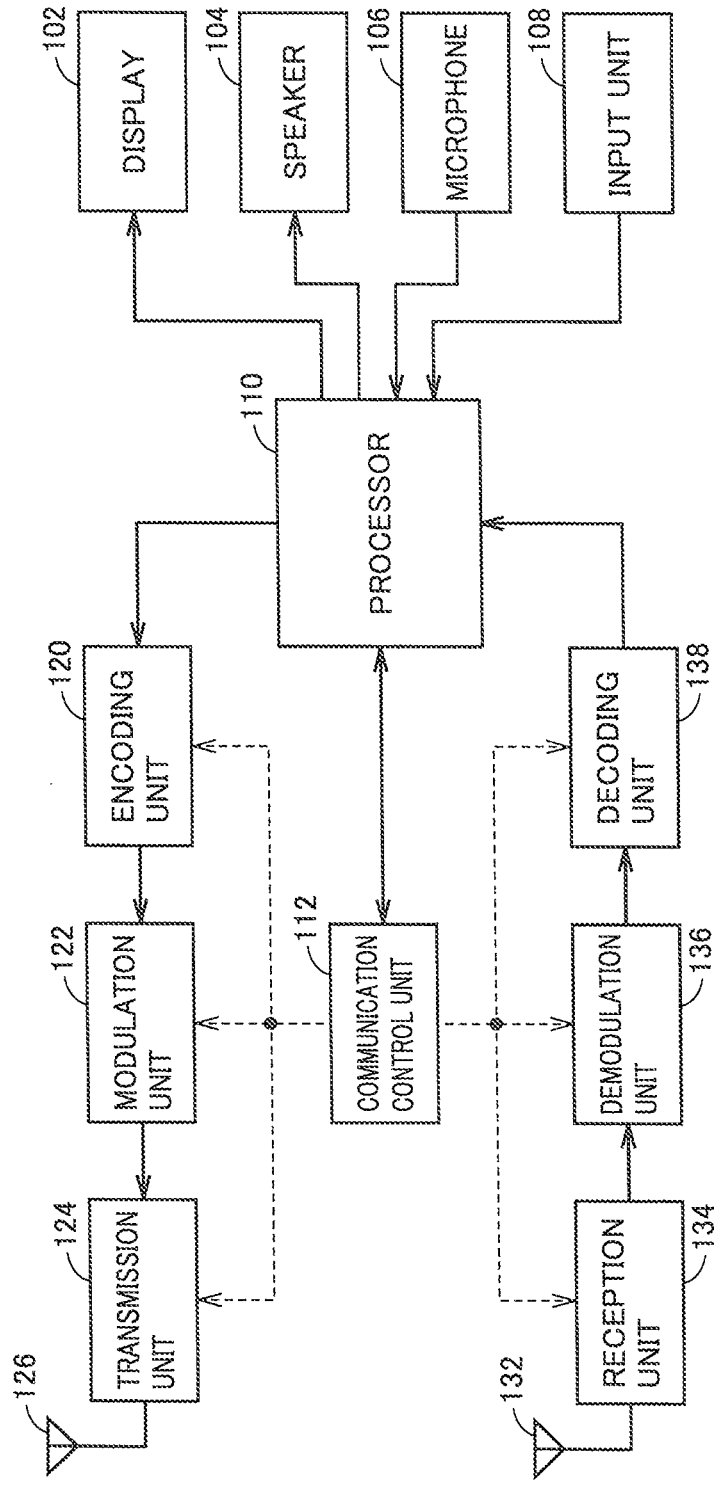
FIG. 3 is a block diagram showing a hardware configuration of the terminal device used in the radio communication system shown in FIG. 1.

A configuration of terminal device 100 used in radio communication system SYS shown in FIG. 1 will be described. FIG. 3 is a block diagram showing a hardware configuration of terminal device 100 used in radio communication system SYS shown in FIG. 1.

Referring to FIG. 3, terminal device 100 includes a processor 110, a communication control unit 112, an encoding unit 120, a modulation unit 122, a transmission unit 124, a transmission antenna 126, a reception antenna 132, a reception unit 134, a demodulation unit 136, and a decoding unit 138.

Processor 110 is an entity controlling the overall processing in terminal device 100, and implemented by a processor such as CPU (Central Processing Unit) or DSP (Digital Signal Processor). Processor 110 runs a plurality of applications as well as processing for managing data communication, for example, as will be described later herein. Basically, processor 110 executes a program installed in advance to thereby implement these functions.

Such a program is installed in advance in terminal device 100. The program, however, may be distributed via any of a variety of recording media or a network. As the storage medium storing the program, a semiconductor storage medium such as flash memory, mask ROM, EPROM (Electronically Programmable Read-Only Memory), EEPROM (Electronically Erasable Programmable Read-Only Memory), or IC (Integrated Circuit) card, an optical disk storage medium such as CD-ROM (Compact Disc-Read Only Memory) or DVD-ROM (Digital Versatile Disk-Read Only Memory), a magneto-optical disk storage medium such as MO (Magnetic Optical Disc) or MD (Mini Disc), or a magnetic storage medium such as FD (Flexible Disk), magnetic tape, or cassette tape, may be used.

In the case where the program is distributed via a network, such a system is employed that makes the program downloadable in a server device or the like disposed on the Internet and allows the server device to be accessed directly or indirectly.

Referring again to FIG. 3, user data or the like which is output from processor 110 is transmitted by the following components to base station 200. Namely, encoding unit 120 encodes the user data which is output from processor 110 and outputs the encoded data to modulation unit 122. Modulation unit 122 modulates the data provided from encoding unit 120 to generate a modulation signal and outputs the modulation signal to transmission unit 124. Transmission unit 124 up-converts the modulation signal to the frequency of carrier wave to generate an RF signal, amplifies the generated RF signal, and outputs the resultant RF signal to transmission antenna 126. From transmission antenna 126, the RF signal is transmitted toward base station 200.

The RF signal which is transmitted from base station 200 is demodulated into user data by the following components, and the user data is input to processor 110. Namely, reception antenna 132 receives the RF signal transmitted from base station 200 and outputs the signal to reception unit 134. Reception unit 134 removes noise from the RF signal provided from reception antenna 132, adjusts the signal level, and outputs the resultant signal to demodulation unit 136.

Demodulation unit 136 demodulates the RF signal provided from reception unit 134 into a data string, and outputs the data string obtained through demodulation to decoding unit 138. Decoding unit 138 decodes the data string provided from demodulation unit 136 to thereby generate user data, and outputs the generated user data to processor 110.

Communication control unit 112 exchanges control information with processor 110 to thereby control transmission of the user data and reception of the user data, for example. More specifically, communication control unit 112 gives a control command to encoding unit 120, modulation unit 122, and transmission unit 124 that are involved in transmission of the user data, and gives a control command to reception unit 134, demodulation unit 136, and decoding unit 138 that are involved in reception of the user data. Accordingly, following a predefined procedure, the terminal device communicates with base station 200.

Terminal device 100 further includes a display 102 which presents a variety of information to a user, a speaker 104 which outputs, to a user, sound obtained from the received data, a microphone 106 which collects sound of a user, and an input unit 108 including keys, a touch panel, and the like for accepting user's manipulation.

[c2: Configuration of Base Station 200]

Figure 4:
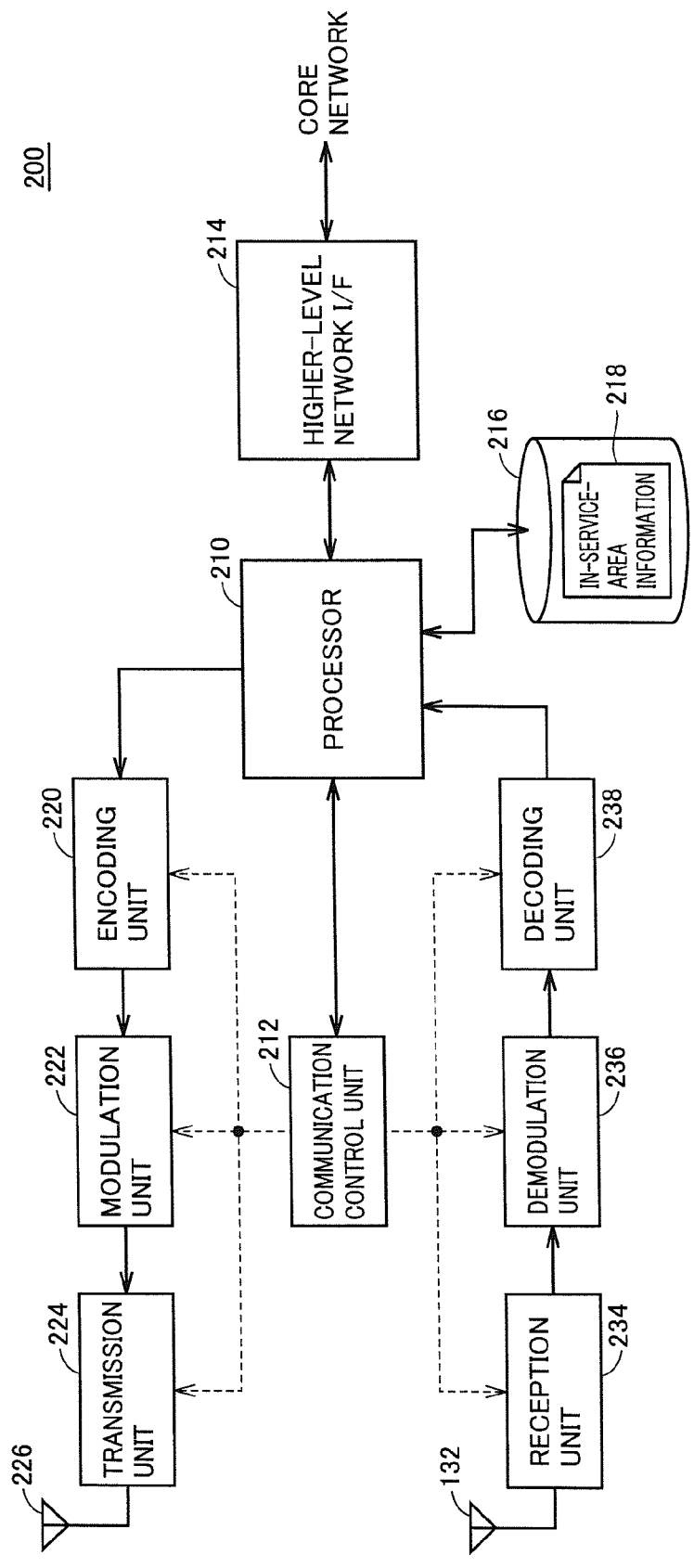
FIG. 4 is a block diagram showing a hardware configuration of a base station used in the radio communication system shown in FIG. 1.

A configuration of base station 200 used in radio communication system SYS shown in FIG. 1 will be described. FIG. 4 is a block diagram showing a hardware configuration of base station 200 used in radio communication system SYS shown in FIG. 1.

Referring to FIG. 4, base station 200 includes a processor 210, a communication control unit 212, a higher-level network interface (I/F) 214, a memory unit 216, an encoding unit 220, a modulation unit 222, a transmission unit 224, a transmission antenna 226, a reception antenna 232, a reception unit 234, a demodulation unit 236, and a decoding unit 238.

Processor 210 is an entity controlling the overall processing in base station 200, and implemented by a processor such as CPU or DSP. Alternatively, a part or the whole of functions provided by processor 210 may be implemented in the form of dedicated hardware (typically integrated circuit).

Processor 210 is connected through higher-level network interface 214 to a higher-level core network, and exchanges user data with the core network. Based on in-service-area information 218 stored in memory unit 216, processor 210 performs packet routing to terminal device 200 which is present in the service area of the local station, a handover procedure, and the like.

The user data received from the higher-level core network or the like is transmitted by the following components to a target terminal device 100. Namely, processor 210 outputs the user data to encoding unit 220. Encoding unit 220 encodes the user data which is output from processor 210 and outputs the encoded data to modulation unit 222. Modulation unit 222 modulates the data provided from encoding unit 220 to generate a modulation signal, and outputs the modulation signal to transmission unit 224. Transmission unit 224 up-converts the modulation signal to the frequency of carrier wave to generate an RF signal, amplifies the generated RF signal, and outputs the resultant RF signal to transmission antenna 226. From transmission antenna 226, the RF signal is transmitted toward terminal device 100.

The RF signal which is transmitted from terminal device 100 is demodulated into user data by the following components, and the user data is input to processor 210. Namely, reception antenna 232 receives the RF signal transmitted from terminal device 100 and outputs the signal to reception unit 234. Reception unit 234 removes noise from the RF signal provided from reception antenna 232, adjusts the signal level, and outputs the resultant signal to demodulation unit 236. Demodulation unit 236 demodulates the RF signal provided from reception unit 234 into a data string, and outputs the data string obtained through demodulation to decoding unit 238. Decoding unit 238 decodes the data string provided from demodulation unit 236 to thereby generate user data, and outputs the generated user data to processor 210.

Communication control unit 212 exchanges control information with processor 210 to thereby control transmission of the user data and reception of the user data, for example.

[c3. Other Configurations]

Regarding gateway 250 and core network control device 350 used in radio communication system SYS shown in FIG. 1, known configurations may be used for them, which will not be described in detail herein.

<D. First Embodiment>

In the first embodiment, a module which manages communication of terminal device 100 collects information about a pattern of use of each application, and determines a communication schedule. Each application follows the determined communication schedule to make, to a communication layer, a request for data communication. In this way, the number of times the RRC connection and authentication process involved in data communication of running applications is reduced.

[d1: Control Configuration]

Figure 5:
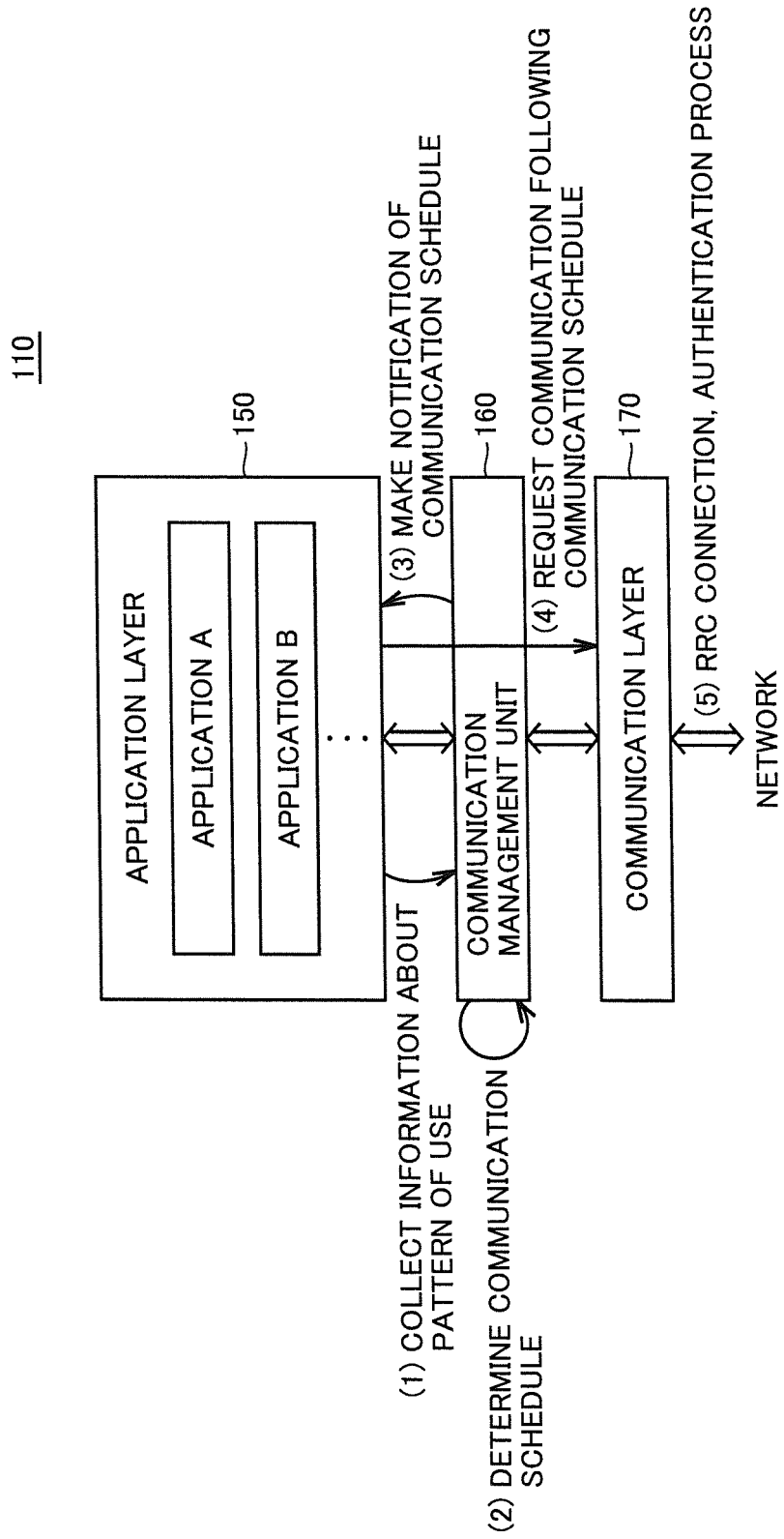
FIG. 5 is a schematic diagram showing a control configuration in the terminal device according to a first embodiment.

FIG. 5 is a schematic diagram showing a control configuration in terminal device 100 according to the first embodiment. Referring to FIG. 5, processor 110 of terminal device 100 includes an application layer 150, a communication management unit 160, and a communication layer 170 that are logically independent of each other.

Application layer 150 includes a variety of applications adapted to perform data communication. Namely, application layer 150 corresponds to application running means for running a plurality of applications adapted to perform data communication.

Communication layer 170 includes a module for performing RRC connection and authentication process involved in data communication. Namely, communication layer 170 corresponds to communication means for performing a procedure necessary for activating data communication to make a state transition to the communicable state, and performing data communication.

Communication management unit 160 corresponds to management means for aggregating requests for data communication that are made respectively by applications and accordingly controlling performance of the procedure involved in performance of data communication.

Communication management unit 160 controls data communication according to the first embodiment. More specifically, communication management unit 160 collects information about a pattern of use of each application which is present in application layer 150. The information about the pattern of use refers to information indicating a potential request for data communication to be performed by each application. By way of example, the information about the pattern of use to be collected includes a part or all of: type of the application; communication cycle length; communication timing; amount of communication data (per communication); communication scheme; allowable delay time of communication (timeout time); contract information; and user setting. Namely, communication management unit 160 has a function of collecting, from each application, information about the pattern of use which indicates a potential request for data communication.

Then, communication management unit 160 utilizes the collected information about the pattern of use of each application to determine a communication schedule. The communication schedule refers to information scheduling data communication allowed to be performed by the application. By way of example, communication management unit 160 determines the contents of the communication schedule such as communication cycle length, communication timing, communication scheme, and the like. Namely, communication management unit 160 has a function of determining schedule information of data communication for each application, using the collected information about the pattern of use.

In the following, the aforementioned contents will be described in more detail.

(1) Communication Cycle

It is supposed for example that a communication cycle length T1 of application A is acquired from application A and a communication cycle length T2 of application B is acquired from application B. At this time, if the relation: communication cycle length T1<communication cycle length T2 is met, communication management unit 160 sets respective communication cycle lengths of these two applications commonly to the longer communication cycle length T2. In this way, respective communication cycle lengths of a plurality of applications can be set commonly to a certain communication cycle length to thereby aggregate procedures of RRC connection and authentication process that are necessary for respective data communications.

(2) Communication Timing

For example, in the case as described above where respective communication cycle lengths of the applications are set commonly to a certain communication cycle length, communication management unit 160 sets the communication timing so that data communication of application A runs and thereafter data communication of application B is performed within a certain time from the execution of data communication of application A or performed following the execution thereof. The aforementioned certain time can be determined depending on the communication scheme. For example, when the communication scheme is the W-CDMA scheme, the certain time may be the time taken for terminal device 100 to change from the Cell_DCH (Cell Dedicated Channel) state to the Cell_FACH (Cell Forward Access Channel) state. When the communication scheme is the LTE scheme, the certain time may be the time taken for terminal device 100 to change from the RRC_CONNECTED state to the RRC_IDLE state. Namely, prior to the state transition of the terminal device (to the idle state for example), data communication is performed.

(3) Communication Scheme

For example, reference may be made to the contract information of a user or terminal device 100 or to user's setting information, an available communication scheme may be specified. More specifically, under the condition that services of a plurality of communication schemes (W-CDMA scheme, LTE scheme, and the like) are being provided, communication management unit 160 determines that only a specific communication scheme is available. Alternatively, communication management unit 160 may determine that data communication is allowed to be performed at a restricted communication speed only, rather than the maximum communication speed of a communication scheme.

(4) Hybrid Type

While the communication cycle length, the communication timing, and the communication scheme have been exemplified as one example of the communication schedule, it is not requisite to use all of them and therefore a part of them may appropriately be combined for use. Further, the communication schedule is not limited to the above contents and therefore other parameters may be used.

After the communication schedule is determined through the procedure as described above, communication management unit 160 notifies each application of the determined communication schedule. Each application follows the communication schedule of which the application has been notified, and accordingly requests communication layer 170 for data communication. Basically, all applications follow the determined communication schedule to accordingly perform communication. Therefore, a plurality of applications perform data communication with the same communication cycle length and/or communication scheme. Namely, communication management unit 160 has a function of restricting requests for data communication that are generated by the applications, using the determined schedule information.

Regarding an application which cannot perform data communication following the determined communication schedule, this application may be permitted to independently perform data communication. In addition, if it becomes necessary for any of the applications to perform, for example, data communication of greater significance that is out of the determined communication schedule, the application transmits to communication management unit 160 a special communication request message. Receiving the communication request message transmitted at any timing, communication management unit 160 permits the application to perform the data communication. This data communication of greater significance includes communication for which the update cycle length is set by a user or a terminal device supplier (including the manufacturer of the terminal device, the dealer of the terminal device, the communication carrier providing the terminal device, for example).

If the request for data communication that is out of the determined communication schedule is frequently made, communication management unit 160 may determine the communication schedule again taking the request into account, and notify the application of the communication schedule again. At this time, if the request for data communication that is out of the determined communication schedule and the re-determination of the communication schedule are repeated, a rejection process may be performed for the application having made the request. Namely, when such a situation occurs, communication management unit 160 transmits to the application a notification of rejection indicating that the request for data communication has been rejected.

When a new application is installed, or setting details of an application are updated, or user's setting is changed, for example, communication management unit 160 collects again information about the pattern of use of each application, determines the communication schedule, and notifies the application of the schedule.

Since the information about the pattern of use of an application includes user's setting, communication management unit 160 can determine the communication schedule on which the user's setting is reflected.

[d2: Processing Procedure]

Figure 6:
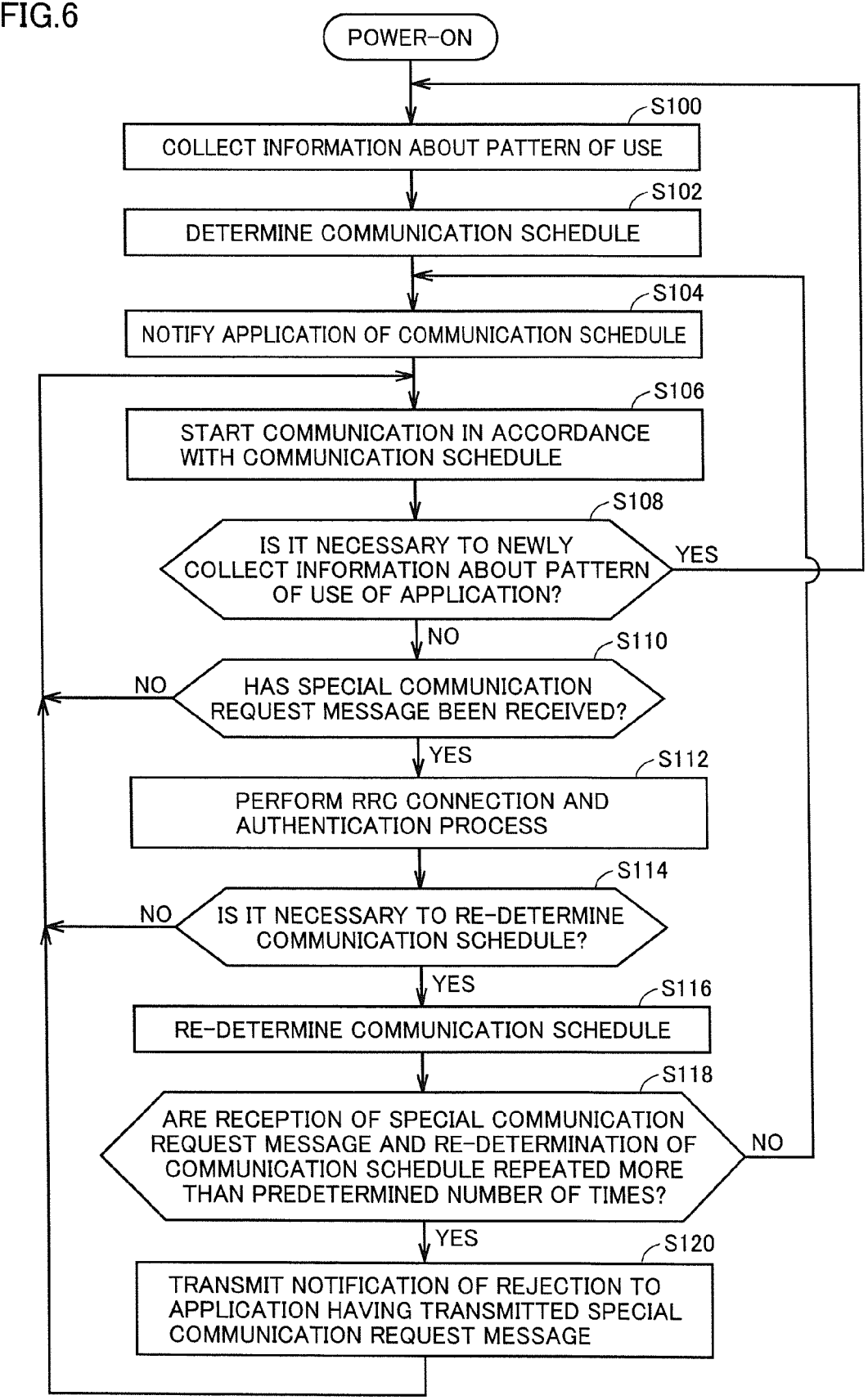
FIG. 6 is a flowchart showing a processing procedure involved in communication processing in the terminal device according to the first embodiment.

Next, a processing procedure involved in communication processing in terminal device 100 according to the first embodiment will be described. FIG. 6 is a flowchart showing the processing procedure involved in communication processing in terminal device 100 according to the first embodiment. Each step shown in FIG. 6 is basically performed through execution of a program by processor 110 of terminal device 100.

Referring to FIG. 6, in response to power-on of terminal device 100, processing is started. At this time, running of a plurality of applications adapted to perform data communication is started. First, processor 110 (communication management unit 160) collects information about a pattern of use of each application (step S100). Subsequently, processor 110 (communication management unit 160) uses the collected information about the pattern of use to determine the communication schedule (step S102). Then, processor 110 (communication management unit 160) notifies each application of the determined communication schedule (step S104).

Processor 110 (each application in application layer 150) starts communication in accordance with the determined communication schedule (step S106). Processing from step S102 to step S106 causes requests for data communication made respectively by the applications to be aggregated. In response to a request for data communication made by an application, processor 110 (communication layer 170) performs RRC connection and authentication process. Namely, in accordance with the aggregated requests for data communication, processing is performed of executing a procedure which is necessary for activating data communication to make a state transition to the communicable state, and performing data communication.

Subsequently, processor 110 (communication management unit 160) determines whether or not it is necessary to newly collect information about the pattern of use of an application (step S108). More specifically, processor 110 (communication management unit 160) determines whether or not a new application has been installed, whether or not setting details of an application have been updated, or whether or not user's setting has been changed, for example.

When it is determined that it is necessary to newly collect information about the pattern of use of an application (YES in step S108), the processing of step S100 and subsequent steps is repeated.

When it is determined that it is not necessary to newly collect information about the pattern of use of an application (NO in step S108), processor 110 (communication management unit 160) determines whether or not a special communication request message has been received from any of the applications that is out of the determined communication schedule (step S110).

When the special communication request message has been received (YES in step S110), processor 110 (communication layer 170) performs RRC connection and authentication process (step S112). Then, processor 110 (communication layer 170) determines whether or not it is necessary to re-determine the communication schedule (step S114). More specifically, this determination is made based on, for example, whether or not the frequency at which the special communication request message is made by a specific application is relatively high.

When it is determined that the communication schedule has to be determined again (YES in step S114), processor 110 (communication management unit 160) re-determines the communication schedule based on, for example, the frequency of reception of the special communication request message for example (step S116). Subsequently, processor 110 (communication management unit 160) determines whether or not reception of the special communication request message and re-determination of the communication schedule are repeated more than a predetermined number of times (step S118). Namely, it is determined whether or not the special communication request message is being transmitted from an application whose request for data communication does not match with those of other applications even when the communication schedule has been changed.

When the number of times reception of the special communication request message and re-determination of the communication schedule are repeated does not exceed the predetermined number (NO in step S118), processing of step S104 and subsequent steps is repeated.

In contrast, when the number of times reception of the special communication request message and re-determination of the communication schedule are repeated exceeds the predetermined number (YES in step S118), processor 110 (communication management unit 160) transmits, to the application having transmitted the special communication request message, a notification of rejection indicating that the data communication request has been rejected (step S120). Then processing of step S106 and subsequent steps is repeated.

Again in step S110, when the special communication request message has not been received (NO in step S110), processing in step S106 and subsequent steps is repeated. Again in step S114, when it is determined that re-determination of the communication schedule is not necessary (NO in step S114), processing in step S106 and subsequent steps is repeated as well.

[d3: Advantages]

In terminal device 100 according to the first embodiment, reduction can be achieved of the number of times the procedure (RRC connection and authentication process), which is necessary for the terminal device in the idle state to start data communication, is performed. Accordingly, power consumption necessary when data communication is started can be reduced.

In terminal device 100 according to the first embodiment, the communication scheme to be used by each application can also be specified. Therefore, a user can specify any desired communication scheme, taking the communication cost and the communication performance into account.

In terminal device 100 according to the first embodiment, in such a case for example where a disaster or the like occurs and thus communication should desirably be continued as long as possible, setting may be done so that only the data communication relevant to minimum required functions is permitted while data communication other than the required data communication is stopped.

<E. Second Embodiment>

In the second embodiment, a module which manages communication of terminal device 100 temporarily stores communication data of each application, and then transmits the stored data at predetermined intervals to a communication layer and requests the communication layer for data communication. In this way, the number of times RRC connection and authentication process involved in data communication of running applications is reduced.

[e1: Control Configuration]

Figure 7:
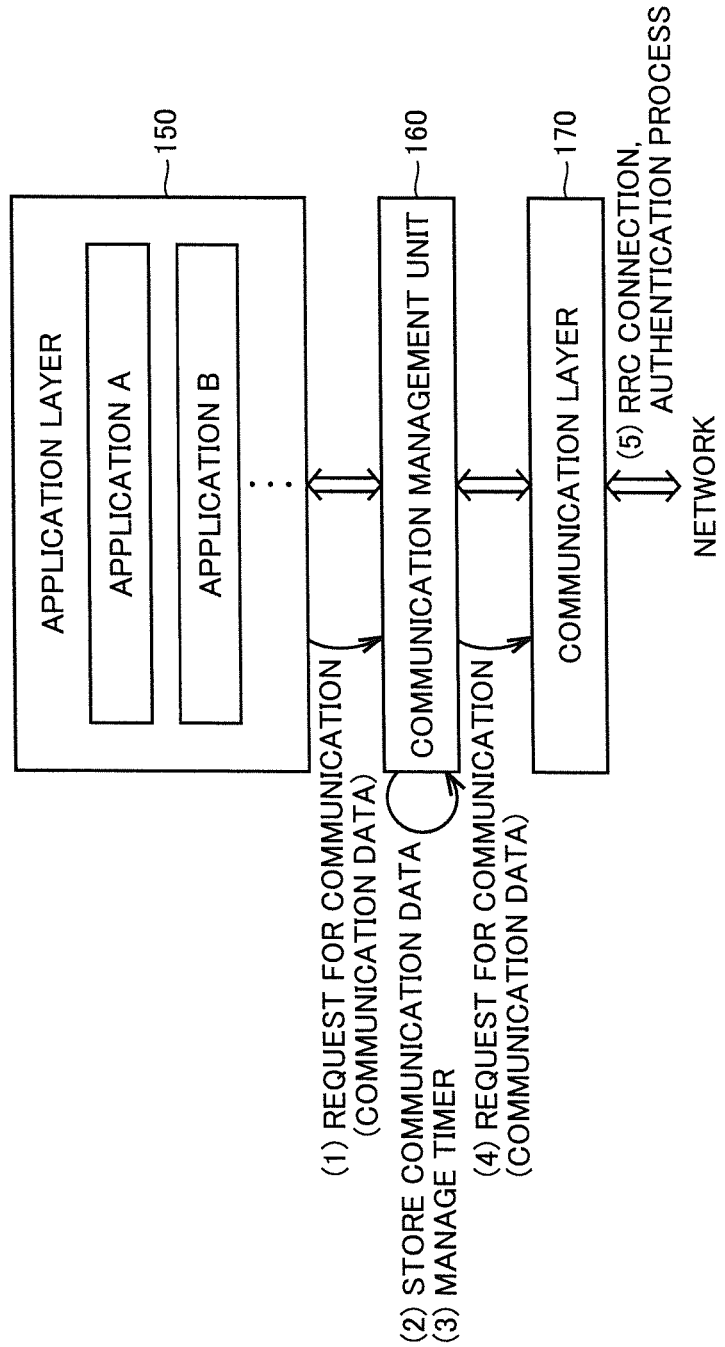
FIG. 7 is a schematic diagram showing a control configuration in the terminal device according to a second embodiment.

FIG. 7 is a schematic diagram showing a control configuration in terminal device 100 according to the second embodiment. Referring to FIG. 7, processor 110 of terminal device 100 includes an application layer 150, a communication management unit 160, and a communication layer 170 that are logically independent of each other.

Application layer 150 includes a variety of applications adapted to perform data communication. Namely, application layer 150 corresponds to application running means for running a plurality of applications adapted to perform data communication.

Communication layer 170 includes a module for performing RRC connection and authentication process involved in data communication. Namely, communication layer 170 corresponds to communication means for performing a procedure necessary for activating data communication to make a state transition to the communicable state, and performing data communication.

Communication management unit 160 corresponds to management means for aggregating requests for data communication that are made respectively by applications and accordingly controlling performance of the procedure involved in performance of data communication.

Each application in application layer 150 makes a request for data communication at any timing. Receiving the request for data communication from the application, communication management unit 160 also receives from the application communication data to be transmitted and temporarily stores the data. Then, at predetermined intervals, communication management unit 160 requests communication layer 170 to start data communication and also provides the stored data to communication layer 170.

Namely, communication management unit 160 includes: a function of receiving from each application a request for data communication as well as corresponding communication data and storing the request and the communication data; and a function of causing, when a predetermined condition (a condition that a predetermined transmission cycle arrives, in the second embodiment) is satisfied, communication layer 170 to perform the procedure involved in performance of data communication, making a state transition to the communicable state, and starting transmission of the stored communication data.

The transmission cycle (predetermined condition) for which communication management unit 160 requests communication layer 170 to start data communication from this cycle may dynamically be determined or statically be determined. It is preferable that the manufacturer of the terminal device, the manufacturer of the platform, or the like can set the cycle in any manner. A typical mode of use may be as follows. Namely, the manufacturer of the terminal device may set, at shipment of the terminal device, a default value as a certain cycle, so that a user may change it later as appropriate for convenience sake.

Further, when it becomes necessary for any application to perform data communication of greater significance, for example, the application transmits a special communication request message to communication management unit 160. When communication management unit 160 receives this special communication request message, communication management unit 160 may request communication layer 170 to start data communication without waiting for arrival of the communication cycle. Namely, receiving a request for data communication of greater significance from any of the applications, communication management unit 160 causes performance of the procedure involved in data communication by communication layer 170 regardless of the transmission cycle (predetermined condition).

In terminal device 100 according to the second embodiment, the applications request, at their own request timings, data communication to be started, while communication management unit 160 processes these requests for data communication altogether.

[e2: Processing Procedure]

Figure 8:
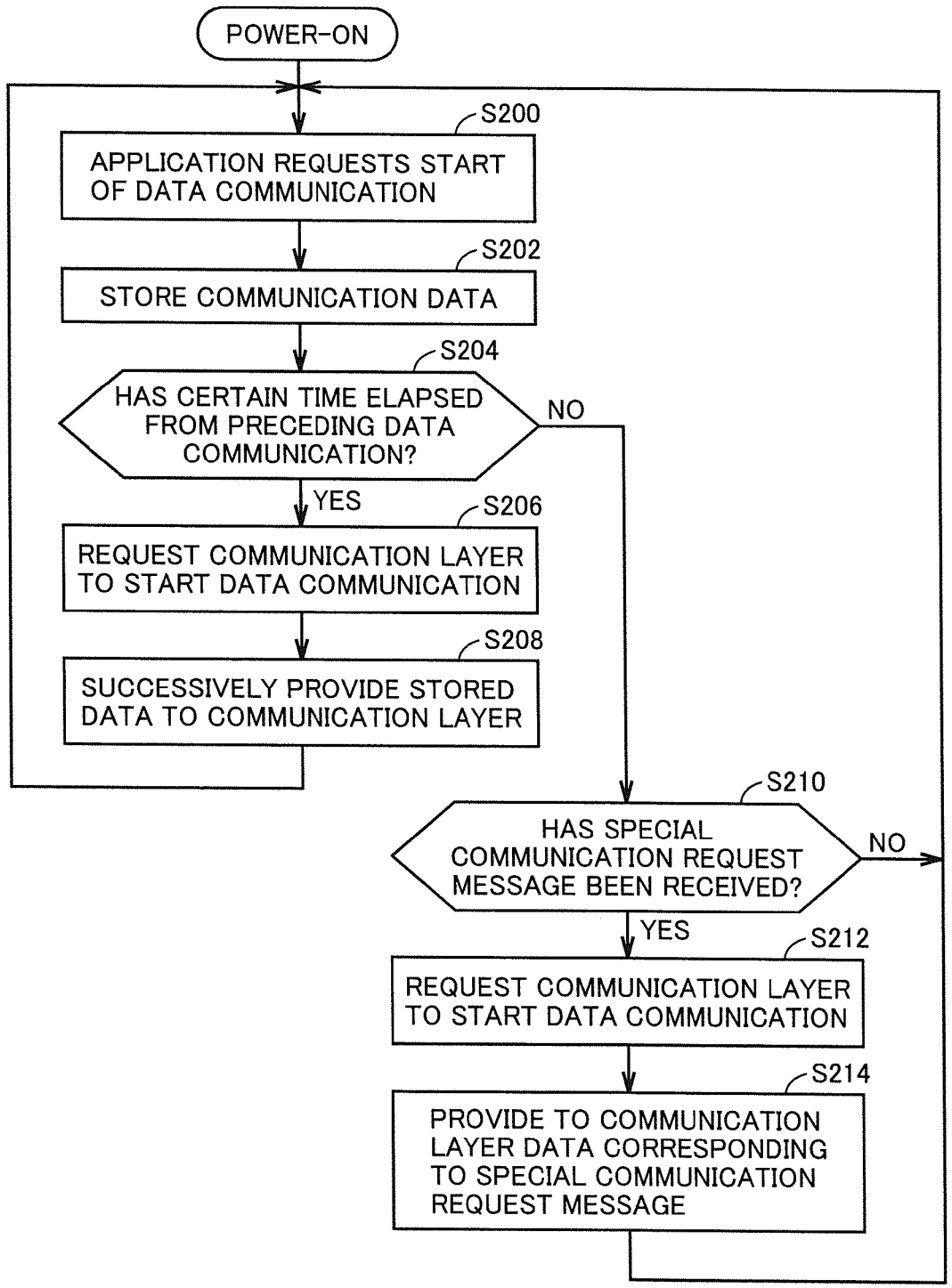
FIG. 8 is a flowchart showing a processing procedure involved in communication processing in the terminal device according to the second embodiment.

Next, a processing procedure involved in communication processing in terminal device 100 according to the second embodiment will be described. FIG. 8 is a flowchart showing the processing procedure involved in communication processing in terminal device 100 according to the second embodiment. Each step shown in FIG. 8 is basically performed through execution of a program by processor 110 of terminal device 100.

Referring to FIG. 8, in response to power-on of terminal device 100, processing is started. At this time, running of a plurality of applications adapted to perform data communication is started. First, processor 110 (each application) requests, at any timing, data communication to be started (step S200). Subsequently, processor 110 (communication management unit 160) temporarily stores the communication data received from each application (step S202).

Subsequently, processor 110 (communication management unit 160) determines whether or not a certain time has elapsed from the preceding data communication (step S204). This determination is made by means of an internal timer or the like.

When a certain time has elapsed from the preceding data communication (YES in step S204), processor 110 (communication management unit 160) requests communication layer 170 to start data communication (step S206). Then, in response to a request made by communication management unit 160 to start data communication, processor 110 (communication layer 170) performs RRC connection and authentication process. Then, processor 110 (communication management unit 160) successively provides the stored data to communication layer 170 (step S208). Processing in step S202 to step S208 causes requests for data communication made respectively by the applications to be aggregated. In accordance with the aggregated requests for data communication, processing is performed of executing the procedure which is necessary for activating data communication, to make a state transition to the communicable state, and performing data communication.

In contrast, even when a certain time has not elapsed from the preceding data communication (NO in step S204), processor 110 (communication management unit 160) determines whether or not it has received a special communication request message from any of the applications (step S210). Namely, processor 110 (communication management unit 160) determines whether or not it has received data of greater significance relative to the data transmitted in normal transmission cycles. When the special communication request message has not been received from any of the applications (NO in step S210), processing in step S200 and subsequent steps is repeated.

When processor 110 (communication management unit 160) has received the special communication request message from any of the applications (YES in step S210), processor 110 (communication management unit 160) requests communication layer 170 to start data communication (step S212). In response to a request for start of data communication that is made by communication management unit 160, processor 110 (communication layer 170) performs RRC connection and authentication process. Then, processor 110 (communication management unit 160) provides to communication layer 170 data corresponding to the received special communication request message (step S214).

[e3: Advantages]

In terminal device 100 according to the second embodiment, reduction can be achieved of the number of times the procedure (RRC connection and authentication process), which is necessary for the terminal device in the idle state to start data communication, is performed. Accordingly, power consumption necessary when data communication is started can be reduced.

In terminal device 100 according to the second embodiment, it is unnecessary to change the timing or the like at which each application makes a request for data communication. Therefore, special communication between application layer 150 and communication management unit 160 is unnecessary.

<F. Third Embodiment>

In the third embodiment, a module which manages communication of terminal device 100 temporarily stores communication data of each application. When the stored data attains a predetermined data value (byte count), the module transmits the stored data to a communication layer and requests the communication layer for data communication. In this way, the number of times RRC connection and authentication process involved in data communication of running applications is reduced.

[f1: Control Configuration]

Figure 9:
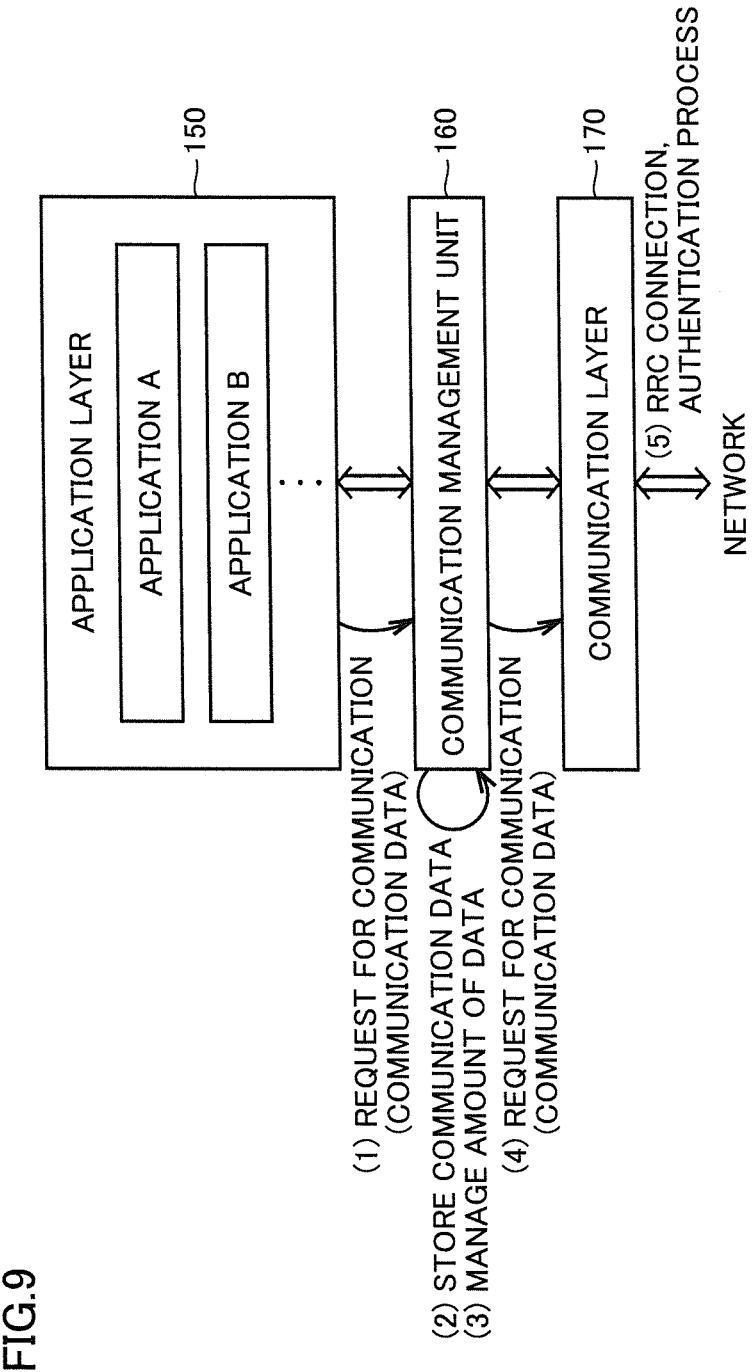
FIG. 9 is a schematic diagram showing a control configuration in the terminal device according to a third embodiment.

FIG. 9 is a schematic diagram showing a control configuration in terminal device 100 according to the third embodiment. Referring to FIG. 9, processor 110 of terminal device 100 includes an application layer 150, a communication management unit 160, and a communication layer 170 that are logically independent of each other. Application layer 150 includes a variety of applications adapted to perform data communication. Namely, application layer 150 corresponds to application running means for running a plurality of applications adapted to perform data communication.

Communication layer 170 includes a module for performing RRC connection and authentication process involved in data communication. Namely, communication layer 170 corresponds to communication means for performing a procedure necessary for activating data communication to make a state transition to the communicable state, and performing data communication.

Communication management unit 160 corresponds to management means for aggregating requests for data communication that are made respectively by applications and accordingly controlling performance of the procedure involved in performance of data communication.

Each application in application layer 150 makes a request for data communication at any timing. Receiving the request for data communication from the application, communication management unit 160 also receives from the application communication data to be transmitted and temporarily stores the data. Then, when the stored data attains a predetermined data value (byte count), communication management unit 160 requests communication layer 170 to start data communication and also provides the stored data to communication layer 170.

Namely, communication management unit 160 includes: a function of receiving from each application a request for data communication as well as corresponding communication data, and storing the request and the communication data; and a function of causing, when a predetermined condition (a condition that the stored communication data attains a predetermined data value, in the third embodiment) is satisfied, communication layer 170 to perform the procedure involved in performance of data communication, making a state transition to the communicable state, and starting transmission of the stored communication data.

The data value (predetermined condition) for which communication management unit 160 requests communication layer 170 to start data communication when the data value is attained may dynamically be determined or statically be determined. It is preferable that a user, the manufacturer of the terminal device, the manufacturer of the platform, or the like can set the data value in any manner. A typical mode of use may be as follows. Namely, the manufacturer of the terminal device may set, at shipment of the terminal device, a "certain byte count" as a default value, depending on the capacity of a memory mounted on the device, so that a user may change it later as appropriate for convenience sake.

Further, when it becomes necessary for any application to perform data communication of greater significance, the application transmits a special communication request message to communication management unit 160. When communication management unit 160 receives this special communication request message, communication management unit 160 may request communication layer 170 to start data communication without waiting for attainment of a predetermined data value (byte count). Namely, receiving a request for data communication of greater significance from any of the applications, communication management unit 160 causes performance of the procedure involved in data communication by communication layer 170 regardless of the transmission cycle (predetermined condition).

In terminal device 100 according to the third embodiment, the applications request, at their own request timings, data communication to be started, while communication management unit 160 processes these requests for data communication altogether.

[f2: Processing Procedure]

Figure 10:
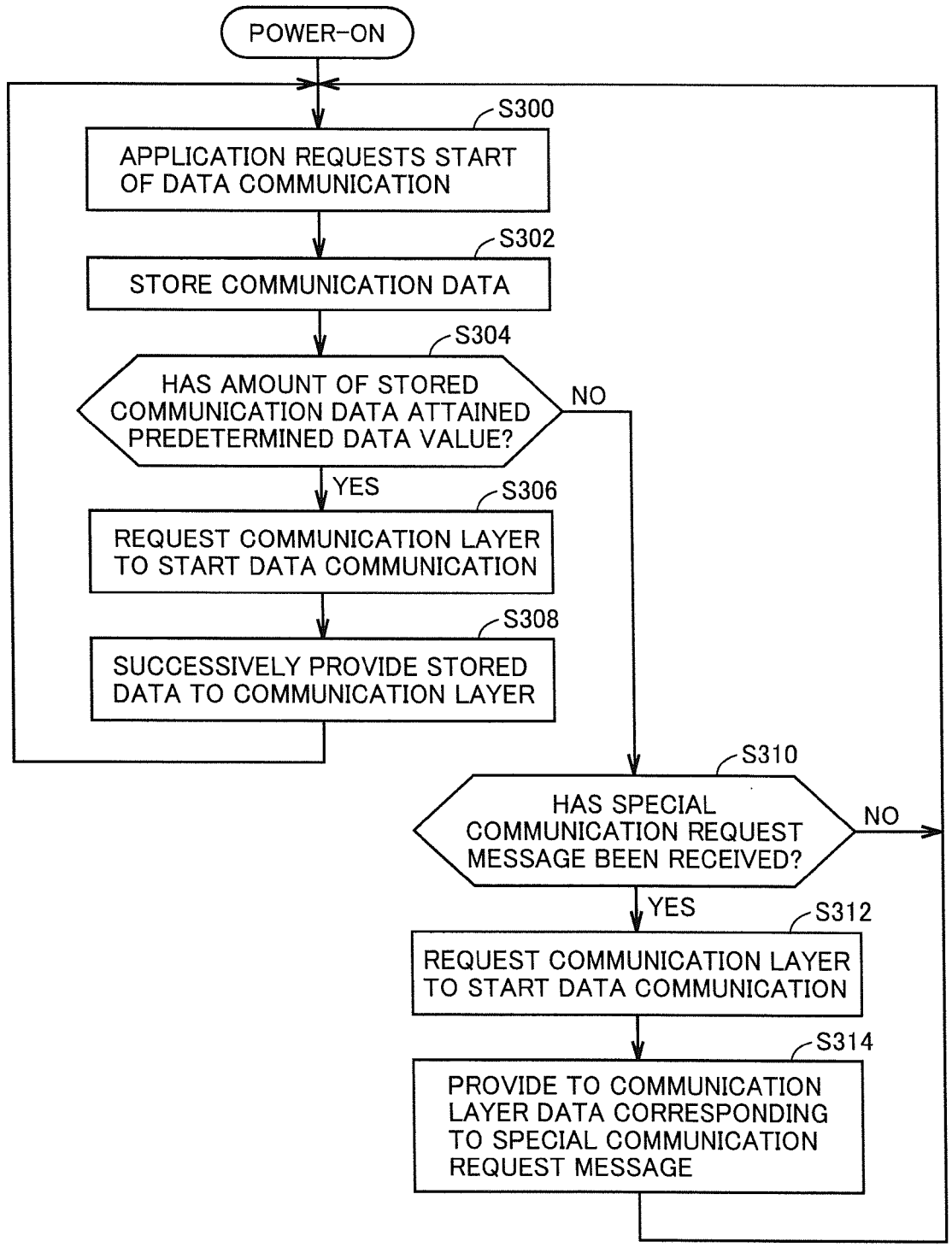
FIG. 10 is a flowchart showing a processing procedure involved in communication processing in the terminal device according to the third embodiment.

Next, a processing procedure involved in communication processing in terminal device 100 according to the third embodiment will be described. FIG. 10 is a flowchart showing the processing procedure involved in communication processing in terminal device 100 according to the third embodiment. Each step shown in FIG. 10 is basically performed through execution of a program by processor 110 of terminal device 100.

Referring to FIG. 10, in response to power-on of terminal device 100, processing is started. At this time, running of a plurality of applications adapted to perform data communication is started. First, processor 110 (each application) requests, at any timing, data communication to be started (step S300). Subsequently, processor 110 (communication management unit 160) temporarily stores the communication data received from each application (step S302).

Subsequently, processor 110 (communication management unit 160) determines whether or not the amount of stored communication data has attained a predetermined data value (byte count) (step S304).

When the amount of stored communication data has attained a predetermined data value (byte count) (YES in step S304), processor 110 (communication management unit 160) requests communication layer 170 to start data communication (step S306). Then, in response to a request made by communication management unit 160 to start data communication, processor 110 (communication layer 170) performs RRC connection and authentication process. Then, processor 110 (communication management unit 160) successively provides the stored data to communication layer 170 (step S308). Processing in step S302 to step S308 causes requests for data communication made respectively by the applications to be aggregated. In accordance with the aggregated requests for data communication, processing is performed of executing the procedure which is necessary for activating data communication to make a state transition to the communicable state, and performing data communication.

In contrast, when the amount of stored communication data has not attained a predetermined data value (byte count) (NO in step S304), processor 110 (communication management unit 160) determines whether or not it has received a special communication request message from any of the applications (step S310). Namely, processor 110 (communication management unit 160) determines whether or not it has received data of greater significance relative to the data transmitted in accordance with normal transmission conditions. When the special communication request message has not been received from any of the applications (NO in step S310), processing in step S300 and subsequent steps is repeated.

When processor 110 (communication management unit 160) has received the special communication request message from any of the applications (YES in step S310), processor 110 (communication management unit 160) requests communication layer 170 to start data communication (step S312). Then, in response to the request for start of data communication that is made by communication management unit 160, processor 110 (communication layer 170) performs RRC connection and authentication process. Then, processor 110 (communication management unit 160) provides to communication layer 170 data corresponding to the received special communication request message (step S314).

[f3: Advantages]

In terminal device 100 according to the third embodiment, reduction can be achieved of the number of times the procedure (RRC connection and authentication process), which is necessary for the terminal device in the idle state to start data communication, is performed. Accordingly, power consumption necessary when data communication is started can be reduced.

In terminal device 100 according to the third embodiment, it is unnecessary to change the timing or the like at which each application requests data communication. Therefore, special communication between application layer 150 and communication management unit 160 is unnecessary.

<G. Other Embodiments>

The features having been illustrated in connection with the first to third embodiments may also be combined as appropriate.

[H. Conclusion]

When terminal device 100 is to perform communication, it is necessary to preliminarily complete the RRC connection procedure and the authentication process procedure and make a state transition to the communicable state. After these procedures are completed, data communication requested by an application becomes possible.

In view of this, the communication layer collects information about each application and respective communication timings of applications are synchronized with each other to thereby reduce the number of times RRC connection and authentication process are performed and accordingly reduce power consumption.

Further, as compared with the case where data is divided into two to be communicated for example, data communication can intensively be performed once so that a radio channel of a higher rate can be selected, and accordingly uplink communication can be completed in a shorter time. Therefore, consumption of power taken by terminal device 100 to amplify an RF signal used for uplink can be reduced.

Moreover, the effect of increasing the capacity of channels in a cell of the communication network is also expected.

In addition, for each application, a user may set relevant information such as allowable delay time of communication (time-out time), communication channel capacity, communication scheme, and the like, to enable the application to be operated as intended by the user.

It should be construed that the embodiments disclosed herein are given by way of illustration in all respects, not by way of limitation. It is intended that the scope of the present invention is defined by claims, not by the description above, and encompasses all modifications and variations equivalent in meaning and scope to the claims.

REFERENCE SIGNS LIST 100 terminal device; 102 display; 104 speaker; 106 microphone; 108 input unit; 110, 210 processor; 112, 212 communication control unit; 120, 220 encoding unit; 122, 222 modulation unit; 124, 224 transmission unit; 126, 226 transmission antenna; 132, 232 reception antenna; 134, 234 reception unit; 136, 236 demodulation unit; 138, 238 decoding unit; 150 application layer; 160 communication management unit; 170 communication layer; 200 base station; 201, 202, 203 service area; 214 higher-level network interface; 216 memory unit; 218 in-service-area information; 250 gateway; 300 core network; 350 core network control device; SYS radio communication system

The invention claimed is:

1. A terminal device configured to perform data communication via a radio signal, comprising:
   a communication control unit; and
   a processor connected to the communication control unit, configured and programmed to:
      run a plurality of applications adapted to perform data communication,
      start, upon receiving a request for data communication, a procedure necessary for activating data communication to make a state transition to a communicable state, and perform data communication, collaborated with the communication control unit, and
      control a procedure of data communication by restricting requests for data communication from the plurality of applications so that subsequent data communication related to the plurality of applications is started before a transition from the communicable state to another state.

2. The terminal device according to claim 1, wherein the processor is further configured and programmed to:
   collect, from each application, information about a pattern of use indicating a potential request for data communication;
   determine schedule information of data communication for each application, using the collected information about the pattern of use; and inform the determined schedule information of each application so that each application makes requests for data communication in accordance with the determined schedule information.

3. The terminal device according to claim 2, wherein the information about the pattern of use includes at least one of respective settings of: type of the application; communication cycle length; communication timing; amount of communication data; communication scheme; allowable delay time of communication; contract information; and user setting.

4. The terminal device according to claim 2, wherein the schedule information includes at least one of respective settings of communication cycle length, communication timing, and communication scheme.

5. A communication method for a terminal device configured to perform data communication via a radio signal, comprising the steps of:

running a plurality of applications adapted to perform data communication;

performing a procedure necessary for activating data communication to make a state transition to a communicable state, and performing data communication; and controlling a procedure of data communication by restricting requests for data communication from the plurality of applications so that subsequent data communication related to the plurality of applications is started before a transition from the communicable state to another state.

6. The communication method according to claim 5, wherein the step of controlling includes:

collecting, from each application, information about a pattern of use indicating a potential request for data communication;

determining schedule information of data communication for each application, using the collected information about the pattern of use; and restricting requests for data communication that are generated by the applications, using the determined schedule information.

7. The communication method according to claim 6, wherein the information about the pattern of use includes at least one of respective settings of: type of the application; communication cycle length; communication timing; amount of communication data; communication scheme; allowable delay time of communication; contract information; and user setting.

8. The communication method according to claim 6, wherein the schedule information includes at least one of respective settings of communication cycle length, communication timing, and communication scheme.

9. A radio communication system comprising:

a base station; and a terminal device configured to perform data communication with the base station via a radio signal, the terminal device including a communication control unit and a processor connected to the communication control unit, the processor configured to:

run a plurality of applications adapted to perform data communication;

start, upon receiving a request for data communication, a procedure necessary for activating data communication to make a state transition to a communicable state, and perform data communication, collaborated with the communication control unit; and control a procedure of data communication by restricting requests for data communication from the plurality of applications so that subsequent data communication related to the plurality of applications is started before a transition from the communicable state to another state, by managing a timing when the request for data communication is given.

10. A non-transitory storage medium having a program stored thereon to be executed by a terminal device configured to perform data communication via a radio signal, the program causing the terminal device to perform the steps of:

running a plurality of applications adapted to perform data communication;

starting, upon receiving a request for data communication, a procedure necessary for activating data communication to make a state transition to a communicable state, and performing data communication; and controlling a procedure of data communication by restricting requests for data communication from the plurality of applications so that subsequent data communication related to the plurality of applications is started before a transition from the communicable state to another state, by managing a timing when the request for data communication is given to the communication means.

* * * * *